J. J. CRUDEN.
DRAG RAKE OR FORK.
APPLICATION FILED APR. 21, 1913.
1,092,693.
Patented Apr. 7, 1914.
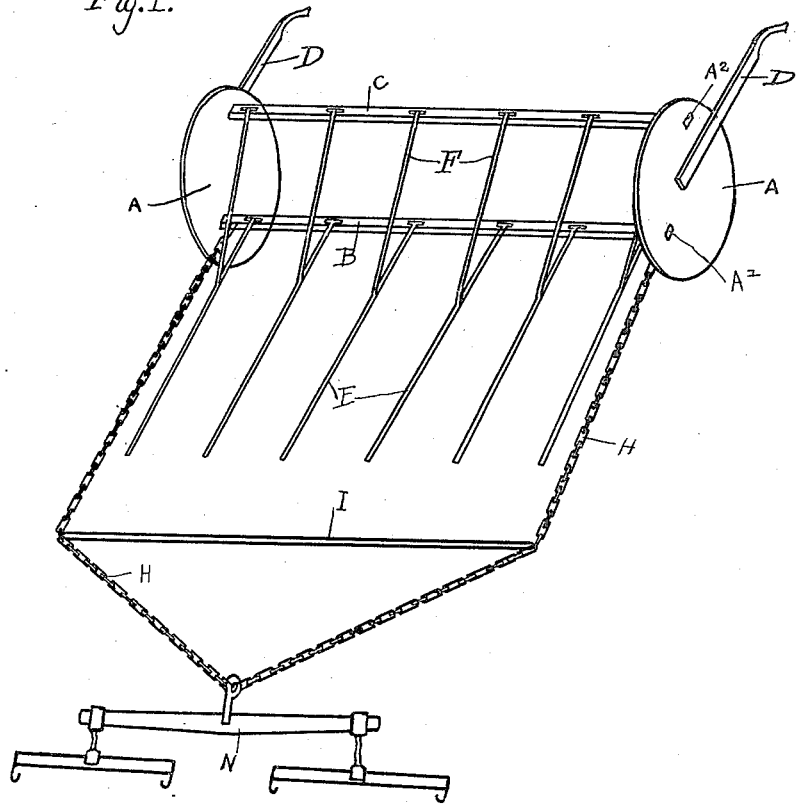
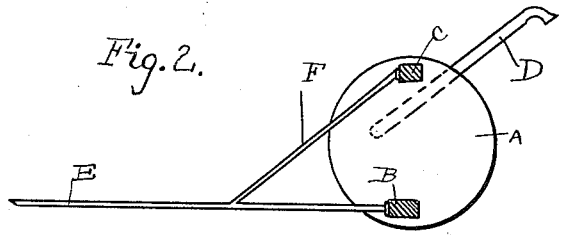
Witnesses
Philip R. Hough
J. W. Sherwood
Inventor
John J. Cruden,
By Franklin N. Hough
Attorney
COLUMBIA PLANOGRAPH CO., WASHINGTON, D. C.

UNITED STATES PATENT OFFICE.

JOHN JOSEPH CRUDEN, OF BLANCHARD, NORTH DAKOTA.

DRAG RAKE OR FORK.

1,092,693. Specification of Letters Patent. Patented Apr. 7, 1914.

Application filed April 21, 1913. Serial No. 762,630.

*To all whom it may concern:*

Be it known that I, JOHN J. CRUDEN, a citizen of the United States, residing at Blanchard, in the county of Traill and State of North Dakota, have invented certain new and useful Improvements in Drag Rakes or Forks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in drag forks for spreading straw, fertilizer, etc., and comprises a simple and efficient device of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a front elevation of an apparatus embodying the features of my invention, and Fig. 2 is a cross sectional view.

Reference now being had to the details of the drawings by letter, A designates two circular-outlined runners to which the bars B and C are fastened in openings A' and A² formed in said runners, and handles D are fastened by any suitable means to said runners, forming convenient means whereby an operator may tilt the runners when it is desired to dump the rake or fork. Projecting from the bar B are the tines E, and F are braces which are fastened at their forward ends to said tines and their upper ends to the bar C. A chain H is fastened at its ends to the ends of the bar B and passes over a spreader I to which the double-tree N is fastened.

The operation of my invention will be readily understood and is as follows:—The circular runners serve as means for supporting the device and the chain causes an equal draft upon the ends of the bar B. When it is desired to cause the apparatus to tilt, the operator by raising up upon the handles will throw the forward ends of the tines into the ground, causing the device to flop over in the usual manner of operation in drag rakes.

What I claim to be new is:—

A drag rake comprising circular-outlined disks, bars parallel to each other and rigidly fastened to said disks, handles fastened to the latter, tines secured to one of said bars and provided with brace strips connecting said tines and the other of the bars, and draft means fastened to the bar carrying said tines, as set forth.

In testimony whereof I hereunto affix my signature in presence of two witnesses.

JOHN JOSEPH CRUDEN.

Witnesses:
DAVID L. WILLIAMS,
J. E. WILLIAMS.

Copies of this patent may be obtained for five cents each, by addressing the "Commissioner of Patents, Washington, D. C."